United States Patent
Szwarc et al.

(10) Patent No.: US 10,877,681 B2
(45) Date of Patent: Dec. 29, 2020

(54) SYSTEMS AND METHODS FOR REDUNDANT ARRAY DATA ALIGNMENT

(71) Applicant: MASTERCARD INTERNATIONAL INCORPORATED, Purchase, NY (US)

(72) Inventors: Wesley Alan Szwarc, Moscow Mills, MO (US); Gerard Tierney, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/583,766

(22) Filed: Sep. 26, 2019

(65) Prior Publication Data

US 2020/0019333 A1 Jan. 16, 2020

Related U.S. Application Data

(63) Continuation of application No. 15/667,036, filed on Aug. 2, 2017, now Pat. No. 10,437,503.

(51) Int. Cl.
   *G06F 3/06* (2006.01)
(52) U.S. Cl.
   CPC ............ *G06F 3/0644* (2013.01); *G06F 3/064* (2013.01); *G06F 3/0604* (2013.01); *G06F 3/0607* (2013.01); *G06F 3/0619* (2013.01); *G06F 3/0659* (2013.01); *G06F 3/0661* (2013.01); *G06F 3/0689* (2013.01)
(58) Field of Classification Search
   CPC .... G06F 3/0644; G06F 3/0604; G06F 3/0619; G06F 3/0659; G06F 3/0626; G06F 3/067; G06F 3/0689; G06F 9/406; G06F 9/44505; G06F 9/441
   See application file for complete search history.

(56) References Cited

U.S. PATENT DOCUMENTS

| | | | |
|---|---|---|---|
| 6,260,068 B1 | 7/2001 | Zalewski et al. | |
| 6,332,180 B1 | 12/2001 | Kauffman et al. | |
| 6,381,682 B2 | 4/2002 | Noel et al. | |
| 7,353,240 B1 | 4/2008 | Takamoto et al. | |

(Continued)

OTHER PUBLICATIONS

PCT International Search Report and Written Opinion, Application No. PCT/US2018/041947, dated Sep. 26, 2018, 14 pps.

(Continued)

*Primary Examiner* — Tracy A Warren
(74) *Attorney, Agent, or Firm* — Armstrong Teasdale LLP

(57) ABSTRACT

A data alignment (DA) computing device is communicatively coupled to a first and a second data storage device. The first data storage device stores an array of partitions including a first subset and a second subset of partitions, and metadata associated with the array that includes a reference pointer for each partition. The DA computing device updates the metadata to remove the reference pointers for the second subset of partitions and thereby remove the second subset from the array, stores a partition table defining the first subset within the first data storage device and the second subset within the second data storage device, stores the metadata associated with the array within the second data storage device, updates the second data storage device to include the second subset of partitions, and updates the metadata stored by the data storage devices to link the second subset of partitions to the array.

20 Claims, 7 Drawing Sheets

(56) References Cited

U.S. PATENT DOCUMENTS

| | | | |
|---|---|---|---|
| 7,360,030 | B1 | 4/2008 | Georgiev |
| 7,409,536 | B2 | 8/2008 | Guo et al. |
| 7,870,332 | B2 | 1/2011 | Wilson |
| 7,877,592 | B2 | 1/2011 | Sun et al. |
| 8,286,161 | B2 | 10/2012 | Togawa |
| 8,364,942 | B2 | 1/2013 | Wood |
| 8,874,889 | B2 | 10/2014 | Teng et al. |
| 9,430,223 | B2 | 8/2016 | Filali-Adib et al. |
| 2004/0003013 | A1 | 1/2004 | Coulthard et al. |
| 2004/0019822 | A1 | 1/2004 | Knapp |
| 2004/0153724 | A1 | 8/2004 | Nicholson et al. |
| 2004/0162955 | A1 | 8/2004 | Jones et al. |
| 2008/0313187 | A1 | 12/2008 | Jewett et al. |
| 2015/0143136 | A1 | 5/2015 | Barney et al. |
| 2015/0198999 | A1 | 7/2015 | Liu |
| 2015/0277934 | A1 | 10/2015 | Zhang et al. |

OTHER PUBLICATIONS

Red Hat Red Hat : "Red Hat Enterprise Linux 3: Introduction to System Administration", Jan. 1, 2003, XP55507749, Raleigh NC, Retrieved from the Internet: URL:https://mirror.hmc.edu/centos/3.4/docs/pdf/rhel-isa-en.pdf, [retrieved on Sep. 18, 2018], pp. 71-122.

SYSTEMS AND METHODS FOR REDUNDANT ARRAY DATA ALIGNMENT

CROSS REFERENCE TO RELATED APPLICATIONS

This application is a continuation application of U.S. patent application Ser. No. 15/667,036, filed Aug. 2, 2017, entitled "SYSTEMS AND METHODS FOR REDUNDANT ARRAY DATA ALIGNMENT", the disclosure of which is hereby incorporated by reference in its entirety.

BACKGROUND

The field of the present disclosure relates generally to data storage configurations, and more specifically, data alignment of partitioned storage devices during an operating system conversion.

Servers and other data storage devices are used to store and communicate data for various applications. For example, servers may be used to store data associated with a payment network that facilitates transactions using payment cards (e.g., credit or debit cards) and payment accounts. The servers typically include a plurality of data storage devices (e.g., hard disk drives and solid state drives) to provide data redundancy and/or increased data storage. An operating system is installed on each server to enable the server to perform standard functions, such as communicate with other devices, store data, and display a graphical user interface (GUI). The operating system includes a set of protocols for each function such that data is received, processed, and transmitted according to a specific format supported by the operating system. For example, an operating system may include one or more file system architectures for connected storage devices to store data, such as file allocation table (FAT), fourth extended filesystem (ext4), and new technology file system (NTFS).

In some cases, the servers may be scheduled to switch or convert operating systems (i.e., due to lack of support, alternative operating systems, etc.). However, converting between operating systems may cause issues with data stored in a file system architecture that is not supported by the new operating system. Accordingly, the server may require on-site technical overview, additional data storage devices, and/or one or more reboots to install the new operating system. The down time caused by the installation and conversion process may be long and inconvenient for users attempting to access the server and the data stored by the server, particularly for data critical to a particular process or service performed by the server.

BRIEF DESCRIPTION

In one aspect, a data alignment (DA) computing device includes a processor communicatively coupled to a first data storage device and a second data storage device, and a memory in communication with the processor. The first data storage device stores an array of partitions and metadata associated with the array of partitions. The array of partitions includes a first subset of partitions and a second subset of partitions mirroring the first subset of partitions and the metadata includes a reference pointer for each partition of the array of partitions. The memory stores instructions that, when executed by the processor, cause the processor to update the metadata to remove the reference pointers for the second subset of partitions and thereby remove the second subset of partitions from the array of partitions, store, within the first and second data storage devices, a partition table that defines the first subset of partitions within the first data storage device and the second subset of partitions within the second data storage device, store the metadata associated with the array of partitions within the second data storage device, update the second data storage device to include the second subset of partitions, and update the metadata stored by the first data storage device and the second data storage device to link the second subset of partitions to the array of partitions.

In another aspect, a method for aligning data in array of partitions including a first subset of partitions and a second subset of partitions is provided. A first data storage device stores the array of partitions and metadata associated with the array of partitions. The method is at least partially performed by a DA computing device. The method includes updating the metadata to remove reference pointers for the second subset of partitions and thereby remove the second subset of partitions from the array of partitions, storing, within the first data storage device and a second data storage device, a partition table that defines the first subset of partitions within the first data storage device and the second subset of partitions within the second data storage device, storing the metadata associated with the array of partitions within the second data storage device, updating the second data storage device to include the second subset of partitions, and updating the metadata stored by the first data storage device and the second data storage device to link the second subset of partitions to the array of partitions.

In yet another aspect, at least one non-transitory computer-readable storage media having computer-executable instructions embodied thereon is provided. When executed by at least one processor, the computer-executable instructions cause the processor to update metadata associated with an array of partitions including a first subset of partitions and a second subset of partitions to remove reference pointers for the second subset of partitions and thereby remove the second subset of partitions from the array of partitions. The metadata and the array of partitions are stored on a first data storage device. The instructions further cause the processor to store, within the first and second data storage devices, a partition table that defines the first subset of partitions within the first data storage device and the second subset of partitions within the second data storage device, store the metadata associated with the array of partitions within the second data storage device, update the second data storage device to include the second subset of partitions, and update the metadata stored by the first data storage device and the second data storage device to link the second subset of partitions to the array of partitions.

BRIEF DESCRIPTION OF THE DRAWINGS

FIG. 1 is a block diagram illustrating an example data alignment (DA) system for aligning data during an operating system conversion in accordance with one embodiment of the disclosure.

FIG. 2 is a block diagram of an example DA system including a DA computing device in communication with a host computing device.

FIG. 3 is an example data schematic of the system shown in FIG. 1.

FIG. 4 is an expanded block diagram of an example embodiment of a remote device for use in the system shown in FIG. 1.

FIG. 5 illustrates an example configuration of a host system for use in the system shown in FIG. 1.

FIG. 6 is a flowchart of an example process for aligning data during an operating system conversion using the system shown in FIG. 1.

FIG. 7 is a diagram of components of one or more example computing devices that may be used in embodiments of the described systems and methods.

DETAILED DESCRIPTION

Figure 1:
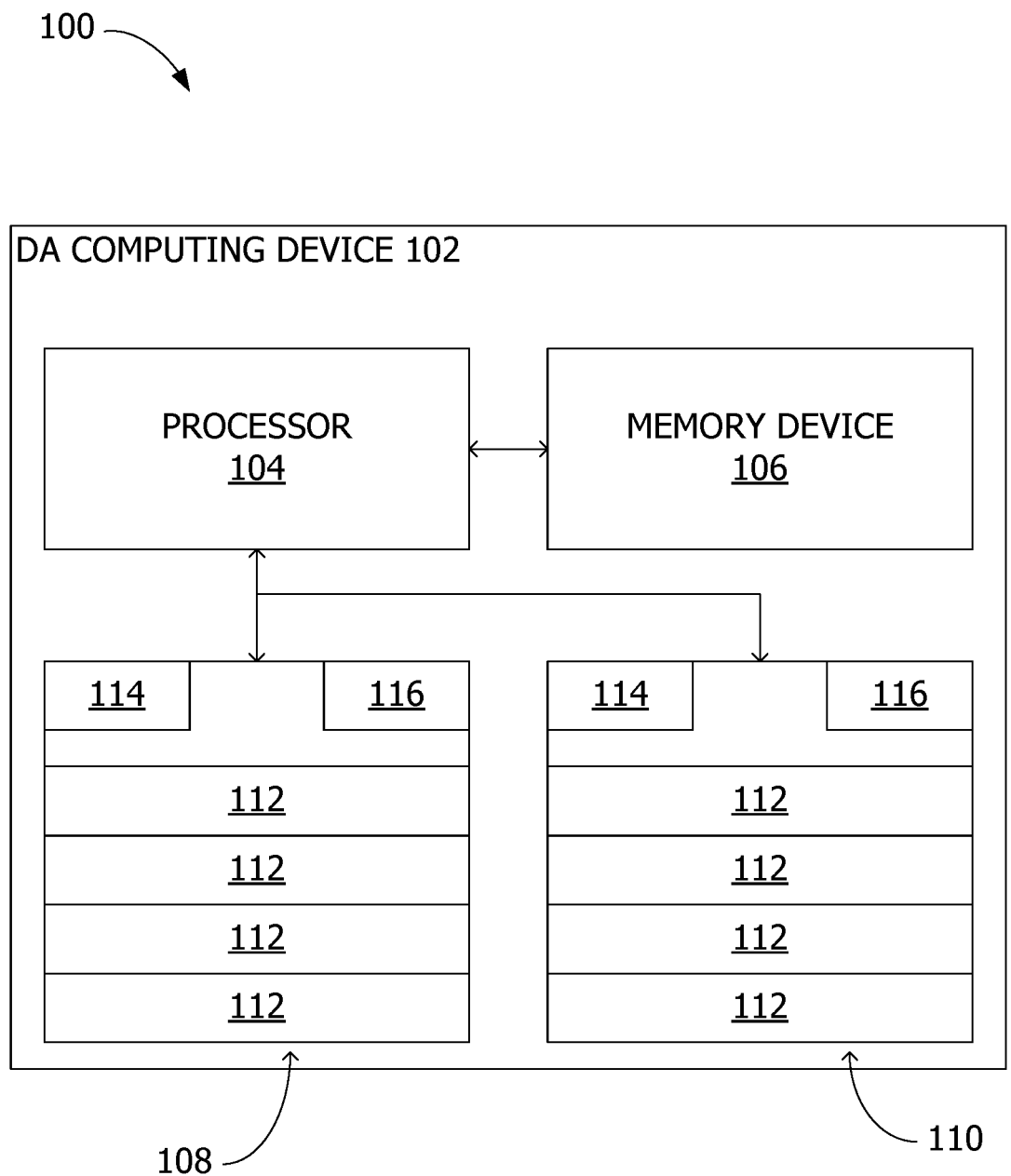
FIGS. 1-7 show example embodiments of the methods and systems described herein.

Systems and method according to this disclosure are directed to data storage configurations, and more specifically, data alignment of partitioned storage devices during operating system conversion.

A data alignment (DA) system is described herein for aligning data storage partitions across multiple physical data storage devices, particularly during a conversion between operating systems (OSes). In the example embodiment, the DA system includes a first data storage device and a second data storage device. The first and second data storage devices may be hard disk drives (HDDs), solid state drives (SSDs), and/or any other suitable type of data storage. Each data storage device includes a plurality of partitions. In at least some embodiments, the first and second data storage devices are configured in a multiple disk (MD) array for data redundancy, increased storage, and/or improved performance. For example, the first and second data storage devices may be in a redundant array of independent disks (RAID) configuration, such as RAID 1 or RAID 5. In the RAID 1 configuration, data stored on the first data storage device is mirrored or copied to the second data storage device. As used herein, a "mirror" refers to a plurality of partitions within a redundant array that store matching copies of data. Redundant arrays, such as RAID 1, are used to prevent data loss in the event of a storage device failure. That is, when a partition or storage device within the redundant array fails, a copy of the data stored by the failed partition is accessible via a respective mirror within the array.

In the example embodiment, the first and second data storage devices store metadata associated with the redundant array. The metadata includes a reference pointer for each partition within the redundant array. In some embodiments, the reference pointer identifies a block device file associated with the partition. The block device file is an interface to enable software to interact with a device driver of the data storage devices to read and write data on the partitions. In one example, the reference pointer is associated with a block device identifier that references a respective block device file. In at least some embodiments, the metadata is part of a superblock stored by both the first and second data storage devices.

In the example embodiment, the first and second data storage devices are in communication with one or more processors and a memory device configured to store instructions for the processors. The first and second data storage devices store instructions and data associated with an OS that, when executed by the processors, cause the processors to operate as a computing device, such as a server. The OS includes a set of specific formats and protocols for various functions of the computing device, including, but not limited to, file system architectures, network protocols, kernel architecture, and the like. The first and second data storage devices are formatted in accordance with one or more file system architectures supported by the installed OS.

In at least some embodiments, the installed OS ("first OS") may be replaced by a new OS ("second OS"). For example, if the installed OS is depreciated due to lack of support, a new OS may be installed on the computing device. To convert to the computing device to a second OS, an image file associated with the second OS is executed by the processors to install the second OS on at least one of the first and second data storage devices. In the example embodiment, the second OS is installed on the first data storage device while the second data storage device has the first OS installed. More specifically, a partition (referred to herein as an "OS partition") is generated on each data storage device to install the respective OS such that a user can test the second OS while retaining the ability to return to the first OS. The OS partition is formatted in a particular file system architecture supported by the respective OS (but may not be supported by the other OS). Additional partitions may be installed on the first and second data storage devices to store data. In certain embodiments, the additional partitions may be formatted in a file system architecture that is supported by both the first and second OS.

To prevent the redundant array from synchronizing across the first and second data storage device (which would overwrite one of the OS partitions), a kickstart configuration file is executed with the image file to configure the array on a single data storage device (i.e., the first data storage device). That is, the kickstart configuration file configures the array to only include partitions of the first data storage device and treats the other half of the mirror as a failed device. By treating part of the mirror as a failed device, the second OS does not overwrite the data on the second data storage device to complete the mirrors of the array. Rather, the array continues to operate with at least partition in each mirror. Accordingly, both the first and second OSes are stored and can be selectively initiated by the computing device. After a determination is made to fully convert to the second OS, the first OS is removed and the redundant array is updated to fully utilize the first and second data storage devices.

In the example embodiment, the DA system includes a DA computing device. In some embodiments, the DA computing device includes the processors in communication with the first and second data storage devices and the memory device. In other embodiments, the DA computing device is communicatively coupled to the processors in communication with the first and second data storage devices. In such embodiments, the processors and the memory device are part of a host computing device including the first and second data storage devices.

The DA computing device is configured to align the first and second data storage devices by performing a data alignment process to enable the first and second data storage devices to operate as an array with the second OS. That is, to operate the data storage devices in an array, the partitions within the first and second data storage devices must include matching sizes and matching file systems to be added to a respective mirror. In at least some known systems, aligning two data storage devices may require additional data storage devices and/or one or more reboots of the computing device to initialize the array, which may interrupt services provided by the computing device. In the example embodiment, the DA computing device uses the "failed" devices as configured by the kickstart configuration file and the "hot-swap" capability of the redundant array to align the first and second data storage devices without using additional data storage devices or rebooting the computing device.

In the example embodiment, the DA computing device is configured to determine whether or not the first and/or second data storage devices are undergoing synchronization or a mirror recovery process before aligning the data storage devices. More specifically, the DA computing device analyzes the metadata to detect any ongoing synchronization or recovery process. The metadata includes a state file or state data that indicates the current state of each mirror in the array. After determining no synchronization or recovery process is occurring, the DA computing device begins the data alignment process.

The DA computing device is further configured to set a data transfer speed for the mirrors within the array to facilitate performing the data alignment process in the background without interrupting the processes or services using the data stored in the first and second data storage devices. In some embodiments, the DA computing device generates and transmits instructions to the block device files associated with the array mirrors to set data transfer speed boundaries.

The DA computing device scans the metadata to identify and remove any data associated with previous arrays. When the DA computing device detects data associated with a previous array, the DA computing device overwrites or removes the data to prevent the data from affecting the data alignment process. The DA computing device may scan the metadata to remove data associated with any previous arrays several times throughout the data alignment process.

The DA computing device updates the metadata stored at least by the first data storage device to remove the reference pointers to the partitions identified as failed devices by the kickstart configuration file. As used herein, the "first subset of partitions" refer to partitions stored by the first data storage device that are not identified as failed devices, and the "second subset of partitions" refer to the partitions identified as failed devices. In at least some embodiments, the DA computing device removes the reference pointers associated with the second subset of partitions from the metadata.

In the example embodiment, the DA computing device generates a partition table for the first and second data storage devices. In some embodiments, the DA computing device retrieves the partition table from a remote computing device. The partition table includes data defining predefined partitions to be generated on the respective data storage device by the data alignment process. The partition table also includes additional information for each partition, such as data capacity, current used data size, and a block device identifier for each partition. The block device identifier is data or a pointer indicating a block device file associated with the partition. In the example embodiment, the partition table includes data entries that match the first subset of partitions and the second subset of partitions. The DA computing device stores the partition table on the second data storage device to overwrite an existing partition table stored by the second data storage device. Overwriting the existing partition table removes the previous partitions from the second data storage device, including the OS partition storing the initial OS. In the example embodiment, the DA computing device stores the metadata associated with the array of partitions on the second data storage device such that matching metadata is stored by the first and second data storage devices. Storing matching metadata enables the array to operate correctly even in the event of the first or second data storage device malfunctioning. Accordingly, when updating or otherwise editing the metadata, the metadata is updated within both the first and the second data storage devices.

In the example embodiment, the DA computing device is configured to update the second data storage device to include the second subset of partitions. More specifically, the DA computing device removes at least one block device identifier associated with previous partitions from the second data storage device. The DA computing device then scans the stored partition table for the second subset of partitions and generates new block device identifiers for the second subset of partitions on the second data storage device based on the partition table. By removing the previous block device identifiers and generating new device identifiers for a subset of partitions that was previously associated with failed devices, the DA computing device has moved a portion of the array of partitions from a single data storage device to two data storage devices without requiring the computing device to be rebooted. That is, the DA computing device uses the hot-swap capability of the redundant array to move the second subset of partitions to the second data storage device without interrupting services or processes using the data stored by the first and second data storage devices.

In the example embodiment, the DA computing device is configured to link the second subset of partitions to the array of partitions by updating the metadata stored the first and second data storage devices to include the reference pointers associated with the second subset of partitions. The reference pointers are configured to reference or identify the new block device identifiers of the second data storage device. The second subset of partitions is synchronized with the first subset of partitions to mirror the data stored by the first subset of partitions.

To align the data storage devices, the first data storage device is also configured to match the second data storage device because at least some redundant arrays (i.e., RAID 1) require each mirror in the redundant array to include at least two matching partitions. The DA computing device performs a process for the first data storage device that is similar to the process for the second data storage device. In particular, in the example embodiment, the DA computing device: (i) removes the reference pointers associated with the first subset of partitions from the metadata, (ii) stores the partition table from the second data storage device, (iii) removes at least one block device identifier associated with the first subset of partitions from the first data storage device, (iv) scans the stored partition table to generate new block device identifiers for the first subset of partitions on the first data storage device, and (v) updates the metadata to include reference pointers for the first subset of partitions, thereby linking the first subset of partitions back to the array of partitions. During configuration of the first data storage device, the second data storage device is accessible for retrieving and storing data, thereby preventing interruption of any services or processes performed using the data stored the first and second data storage devices. After the metadata has been updated to include the reference pointers for the first subset of partitions, the data of the first and second data storage devices has been aligned and the array of partitions is configured to use both data storage devices.

In the example embodiment, the DA computing device expands at least one mirror of the array to include any unused space on the first and second data storage devices. Each mirror includes at least one partition from each data storage device, and therefore expanding one mirror will expand the respective partitions on each data storage device.

The DA computing device then saves the metadata to an array configuration file associated with the redundant array such that the array will remain after any reboots. In at least some embodiments, the DA computing device installs a boot loader, such as Grand Unified Bootloader (GRUB), on both the first and the second data storage devices such that the new OS is bootable from either data storage device. The boot loader is configured to determine which devices, and in what order, to access to initiate an OS.

In some embodiments in which the DA computing device is directly in communication with the data storage devices, the DA computing device may receive a script or set of instructions from a remote computing device that cause the DA computing device to perform the data alignment process described above. In other embodiments, the DA computing device is in communication with a host computing device including the first and second data storage devices. In such embodiments, the DA computing device is configured to generate scripts that cause the host computing device to perform the data alignment process. Alternatively, the script may be generated and processed locally (i.e., not received from another computing device). Using scripts enables the data alignment process to be at least partially automated to reduce the professional overview needed to complete the process.

To generate the scripts, the remote computing device or the DA computing device is configured to collect environment variables associated with the data storage devices, such as, but not limited to, a log file data, a host name, and a disk size associated with the first and second data storage devices. The log file data identifies a location and format of a log file that records information about the script as it is processed by the receiving computing device. The host name identifies the computing device designated to run the script. These environment variables are collected and inserted into the script to customize the script for a particular recipient computing device.

The methods and systems described herein may be implemented using computer programming or engineering techniques including computer software, firmware, hardware or any combination or subset thereof, wherein the technical effects may be achieved by performing one of the following steps: (i) updating metadata associated with an array of partitions including a first and second subset of partitions to remove the second subset of partitions by identifying the second subset of partitions as failed partitions; (ii) storing a partition table at the first and second data storage devices that identifies the first and second subset of partitions; (iii) updating the second data storage device to include the second subset of partitions by removing at least one block device identifier associated with previous partitions from the second data storage device and scanning the stored partition table for the second subset of partitions to generate new block device identifiers for the second subset of partitions; (iv) linking the second subset of partitions to the array of partitions by updating the metadata to include the reference pointers of the second subset of partitions that are associated with the new block device identifiers for the second subset of partitions; (v) after linking the second subset of partitions to the array of partitions, removing the reference pointers removing the reference pointers associated with the first subset of partitions from the metadata; (vi) removing at least one block device identifier associated with the array of partitions from the first data storage device; (vii) scanning the stored partition table for the first subset of partitions to generate new block device identifiers for the first subset of partitions on the first data storage device; (viii) updating the metadata to include the reference pointers for the first subset of partitions; (ix) expanding at least one partition of the first and second subset of partitions to include unused data storage space of the first and second data storage devise; and (x) installing a boot loader on the first and second data storage devices to enable an operating system stored on the first and second data storage devices to initialize from the first data storage device or the second data storage device.

The systems and methods described herein are configured to facilitate (a) reducing bandwidth and processing interference with services and processes using data stored on data storage devices converting between OSes; (b) reducing professional overview by automating the data alignment process using scripts; (c) reducing time needed to align an array on two data storage devices by performing the data alignment process in the background; and (d) improved data security by providing the option to return to the initial OS while testing the new OS in a redundant array.

Described herein are computer systems such as a host computing device and a DA computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to align data between data storage devices during an operating system conversion.

FIG. 1 is a block diagram of an example data alignment (DA) system 100 for aligning data between two data storage devices in a redundant array. In the example embodiment, system 100 includes a DA computing device 102. DA computing device 102 includes a processor 104, a memory device 106 in communication with processor 104, a first data storage device 108, and a second data storage device 110. In some embodiments, first and/or second data storage devices 108, 110 are separate from DA computing device 102. For example, first and second data storage devices 108, 110 may be configured as a network attached storage (NAS) in communication with DA computing device 102. In other embodiments, system 100 may include additional, fewer, or alternative components, including those described elsewhere herein. For example, DA computing device 102 may include three or more data storage devices.

DA computing device 102 is configured to provide one or more processes or services associated with data stored in first and second data storage devices 108, 110. For example, DA computing device 102 may be configured to facilitate data communication in a payment network between different parties, such as to transmit and receiving messages regarding authentication, authorization, settlement, and/or otherwise processing payment transactions in the payment network. In other embodiments, DA computing device 102 is configured to provide a different services or process using the data stored in data storage devices 108, 110.

In the example embodiment, first and second data storage devices 108, 110 have a data storage capacity that is divided into a plurality of partitions 112. Partitions 112 are subsections of data storage devices 108, 110. Prior to the data alignment process described herein, first data storage device 108 is associated with a first operating system (OS) and second data storage device 110 is associated with a second OS different from the first OS. In particular, first data storage device 108 includes at least one partition 112 that is formatted according to a file system architecture associated with the first OS and similarly for second data storage device 110 and the second OS. In some embodiments, at least some partitions 112 are accessible by both the first and second OSes.

Each partition 112 is associated with a block device file (not shown in FIG. 1). The block device file enables software applications (including the OS) to interact with partitions 112. Each block device file may be associated with multiple partitions. Data storage devices 108, 110 include one or more block device identifiers (not shown in FIG. 1) that reference or point to the associated block device file. In some embodiments, rather than a block device file, partitions 112 may be associated with a character device file.

To identify partitions 112 on each data storage device 108, 110, data storage devices 108, 110 include a respective partition table 114. Partition table 114 defines information regarding each partition 112 on a respective data storage device 108 or 110, such as, but not limited to, data storage capacity, currently used data storage, a partition identifier (i.e., a name of the respective partition 112), and one or more reference pointers for arrays of partitions 112. Partition table 114 is used by DA computing device to identify and interact with partitions 112 of data storage devices 108, 110.

In the example embodiment, first data storage device 108 and/or second data storage device 110 include metadata 116 associated with an array of partitions, such as a redundant array of independent disks (RAID). Arrays are used to provide redundancy and/or performance increases on data storage devices. For example, first data storage device 108 is configured in a RAID 1 configuration to include one or more mirrors using partitions 112 on first data storage device 108. In other embodiments, first data storage device 108 is in a different array configuration (e.g., RAID 5 or RAID 6). In the example embodiment, metadata 116 includes a plurality of reference pointers (not shown in FIG. 1) for the partitions in the array. Each reference pointer identifies the block device file(s) associated with a respective partition 112. In one embodiment, the reference pointer is the block device identifier associated with partition 112. In another embodiment, the reference pointer identifies the block device identifier. In the example embodiment, when the array is stored only on first data storage device 108, metadata 116 may not be stored on second data storage device 110.

In the example embodiment, the array of partitions includes one or more mirrors. Each mirror includes a plurality of partitions 112. Each partition 112 within a mirror stores matching data. During an OS conversion from the second OS associated with second data storage device 110 to the first OS associated with first data storage device 108, first data storage device 108 is configured to include an array of partitions only using partitions 112 of first data storage device 108. That is, metadata 116 of first data storage device 108 is updated to include only reference pointers for partitions 112 of first data storage device 108. At least one partition 112 of each mirror in the array is identified by DA computing device 102 as a "failed" device. In the example embodiment, identifying partitions 112 as failed will prevent a kernel of the first OS from attempting to synchronize data on first data storage device 108 with second data storage device 110, thereby maintaining the second OS on second data storage device 110 during testing of the first OS.

After a determination has been made to use the first OS, a data alignment process is executed by DA computing device 102 as described herein. The data alignment process is used to transfer the failed partitions 112 from first data storage device 108 to second data storage device 110 to utilize both data storage devices without interrupting the services or processes performed by DA computing device 102. That is, DA computing device 102 is not required to reboot several times to reinitialize the array of partitions with the first OS.

Figure 2:
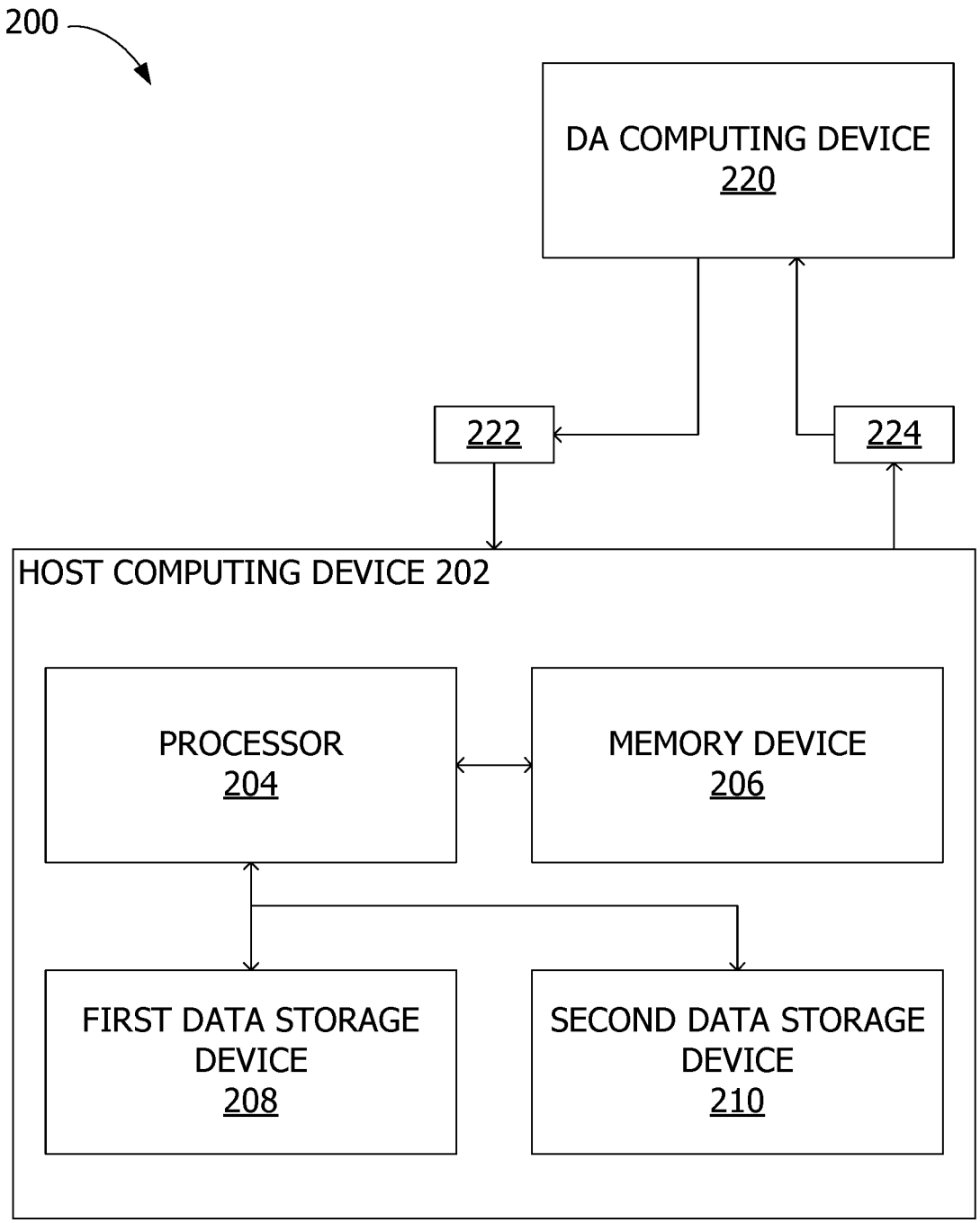

FIG. 2 is a block diagram of an example DA system 200 similar to system 100 (shown in FIG. 1). Unlike system 100, DA system 200 includes a host computing device 202 in communication with a DA computing device 220. Host computing device 202 includes one or more processors 204, a memory device 206, a first data storage device 208, and a second data storage device 210. In other embodiments, host computing device 202 includes additional, fewer, or alternative components, including those described elsewhere herein.

DA computing device 220 is a remote computing device that is configured to generate a script 222 and transmit script 222 to host computing device 202. Script 222 is a data file storing instructions or commands that, when executed by processor 204, cause host computing device 202 to operate similar to DA computing device 102 (shown in FIG. 1). More specifically, host computing device 222 is configured to perform a data alignment process using first and second data storage devices 208, 210 as described herein based on script 222.

In the example embodiment, DA computing device 220 is configured to retrieve one or more environment variables 224 from host computing device 202. Environment variables 224 include information specific to host computing device 202, such as log file data, a device identifier, and a data storage capacity of first and second data storage devices 208, 210. DA computing device 220 is further configured to populate script 222 with environment variables 224 to enable script 222 to execute properly on host computing device 202. That is, script 222 may be stored as a template that is populated with environment variables 224 to deploy to host computing device 202. In some embodiments, script 222 is generated and executed by host computing device 202.

Figure 3:
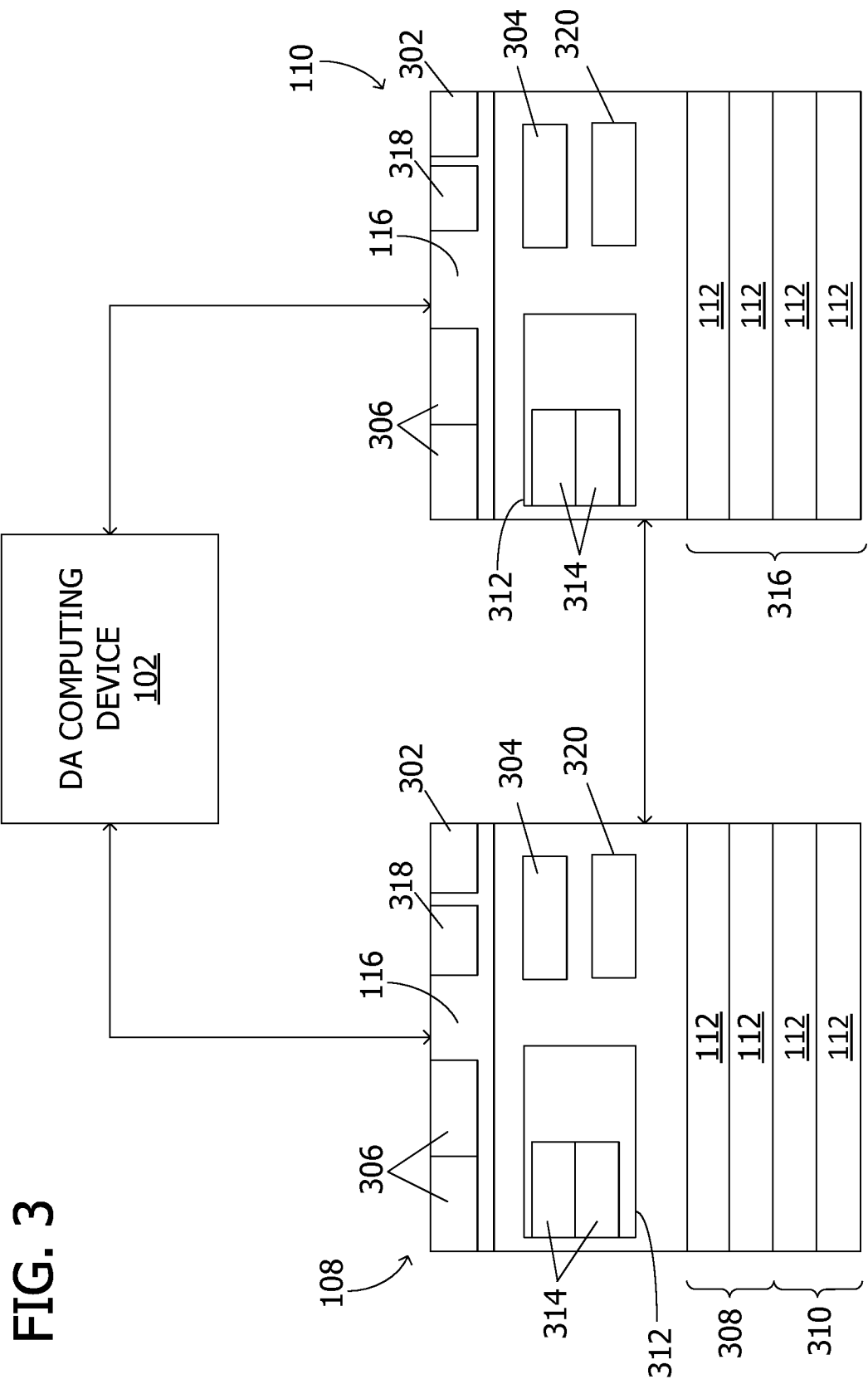

FIG. 3 is a data schematic of system 100 (shown in FIG. 1) during an example data alignment process. The example data alignment process is performed after a second OS has been stored on first data storage device 108 using "failed" partitions and second data storage device 110 stores a first OS. Although first and second data storage devices 108, 110 are depicted as separate from DA computing device 102 in FIG. 3, it is to be understood that DA computing device 102 may include first and/or second data storage devices 108, 110. In some embodiments, the data alignment process may be performed under different circumstances. In other embodiments, the data alignment process includes additional, fewer, or alternative data and/or steps, including those described elsewhere herein.

With respect to FIGS. 1 and 3, in the example embodiment, DA computing device 102 is configured to determine whether or not first and/or second data storage devices 108, 110 are undergoing synchronization or a mirror recovery process before aligning the data storage devices. More specifically, the DA computing device analyzes metadata 116 to detect any ongoing synchronization or recovery process. A synchronization or recovery process is performed to ensure matching data is stored in each partition 112 of a mirror. Metadata 116 includes a state file or state data 302 that indicates the current state of each mirror in the array. For example, but without limitation, state data 302 may identify each mirror as "operating", "failed", "synchronizing", and the like. After determining no synchronization or recovery process is occurring, DA computing device 102 begins the data alignment process.

DA computing device 102 is configured to set a data transfer speed for the mirrors within the array to facilitate performing the data alignment process in the background without interrupting any processes or services using the data stored in first and second data storage devices 108, 110. In some embodiments, DA computing device 102 generates and transmits instructions to block device files 304 associated with the array mirrors to set data transfer speed boundaries.

DA computing device 102 scans metadata 116 to identify and remove any data associated with previous arrays. The data may include, but is not limited to, reference pointers associated with a previously configured array. When DA computing device 102 detects data associated with a previous array, DA computing device 102 overwrites or removes the data from metadata 116 to prevent the data from affecting the data alignment process. DA computing device 102 may scan metadata 116 to remove data associated with any previous arrays several times throughout the data alignment process.

DA computing device 102 updates metadata 116 stored at least by first data storage device 108 to remove reference pointers 306 associated with partitions 112 identified as failed devices by the kickstart configuration file. As used herein, a "first subset of partitions 308" refer to partitions 112 stored by first data storage device 108 that are not identified as failed devices, and a "second subset of partitions 310" refer to partitions 112 identified as failed devices. In at least some embodiments, DA computing device 102 removes reference pointers 306 associated with second subset of partitions 310 from metadata 116.

In the example embodiment, DA computing device 102 generates a partition table 312 for first and second data storage devices 108, 110. In other embodiments, DA computing device 102 retrieves partition table 312 from memory device 104, a remote database (not shown), and/or a different memory device. Partition table 312 includes data defining predetermined partitions 112 to be configured on the respective data storage device through the data alignment process. That is, partition table 312 on first data storage device 108 includes data defining first subset of partitions 308 within first data storage device 108 and partition table 312 on second data storage device 110 includes data defining second subset of partitions 310 within second data storage device 110. In the example embodiment, partition table 312 for each data storage device 108, 110 includes data defining both subsets of partitions 308, 310 within first and second data storage devices 108, 110, respectively. Partition table 312 also includes additional information for each partition 112, such as data capacity, current used data size, and a block device identifier 314 for each partition 112. Block device identifier 314 is data or a pointer indicating a block device file 312 associated with a partition 112. DA computing device 102 stores partition table 312 on the second data storage device 110 to overwrite previous partitions stored by second data storage device 110, including any previous partitions 316 associated with a previous OS (i.e., the first OS). For example, at least one previous partition 316 may be formatted in a file system architecture supported by the previous OS.

DA computing device 102 stores metadata 116 associated with the array of partitions within second data storage device 110 to facilitate moving second subset of partitions 310 to second data storage device 110. In one embodiment, metadata 116 may be copied from metadata 116 stored by first data storage device 108. Matching copies of metadata 116 are stored on first and second data storage devices 108, 110 such that any updates or edits to metadata 116 are stored by both data storage devices 108, 110. Matching metadata 116 enables the array of partitions to continue to operate even in the event of device failure.

In the example embodiment, DA computing device 102 is configured to update second data storage device 110 to include second subset of partitions 310. More specifically, DA computing device 102 removes at least one block device identifier 314 associated with previous partitions 316 from second data storage device 110. DA computing device 102 then scans the stored partition table 312 for second subset of partitions 310 and generates new block device identifiers 314 for second subset of partitions 310 on second data storage device 110. By removing the previous block device identifiers 314 and generating new device identifiers 314 for a subset of partitions that was previously associated with failed devices, DA computing device 102 has moved a portion of the array of partitions from a single data storage device to two data storage devices without requiring the computing device to be rebooted. That is, DA computing device 102 uses the hot-swap capability of the redundant array to move second subset of partitions 310 to second data storage device 110 without interrupting services or processes using the data stored by first and second data storage devices 108, 110.

In the example embodiment, DA computing device 102 is configured to link second subset of partitions 310 to the array of partitions by updating metadata 116 stored in first and second data storage devices 108, 110 to include reference pointers 306 associated with second subset of partitions 310. Reference pointers 306 are configured to reference or identify the new block device identifiers 314 of second data storage device 110. Second subset of partitions 310 is synchronized with first subset of partitions 308 to mirror the data stored by first subset of partitions 308.

To align data storage devices 108, 110, first data storage device 108 is also configured to match second data storage device 110 because at least some redundant arrays (i.e., RAID 1) require each mirror in the redundant array to include at least two matching partitions. DA computing device 102 performs a process for first data storage device 108 similar to the process for second data storage device 110. In particular, in the example embodiment, DA computing device 102: (i) removes reference pointers 306 associated with first subset of partitions 308 from metadata 116, (ii) stores partition table 308 from second data storage device 110, (iii) removes at least one block device identifier 314 associated with first subset of partitions 308 from first data storage device 108, (iv) scans the stored partition table 308 to generate new block device identifiers 314 for first subset of partitions 308 on first data storage device 108, and (v) updates metadata 116 stored in first and second data storage devices 108, 110 to include reference pointers 306 for first subset of partitions 308, thereby linking first subset of partitions 308 to the array of partitions. During configuration of first data storage device 108, second data storage device 110 is accessible for retrieving and storing data, thereby preventing interruption of the services and/or processes using the stored data. After metadata 116 has been updated to include reference pointers 306 for first subset of partitions 308, the data of first and second data storage devices 108, 110 has been aligned and the array of partitions is configured to use both data storage devices 108, 110.

In the example embodiment, DA computing device 102 expands at least one mirror of the array to include any unused space on first and second data storage devices 108, 110. Each mirror includes at least one partition 112 from each data storage device 108, 110, and therefore expanding one mirror will expand the respective partitions 112 on each data storage device 108, 110. DA computing device 102 then saves metadata 116 to an array configuration file 318 associated with the redundant array such that the array will remain after any reboots. In some embodiments, array configuration file 318 is stored within first and/or second data storage devices 108, 110. In other embodiments, array configuration file 318 is stored in a separate data storage device, such as an array controller (not shown). In at least some embodiments, DA computing device 102 installs a boot loader 320, such as Grand Unified Bootloader (GRUB), on first and second data storage devices 108, 110 such that the new OS is bootable from either data storage device 108, 110. Boot loader 320 is configured to determine which devices, and in what order, to access to initiate an OS.

Figure 4:
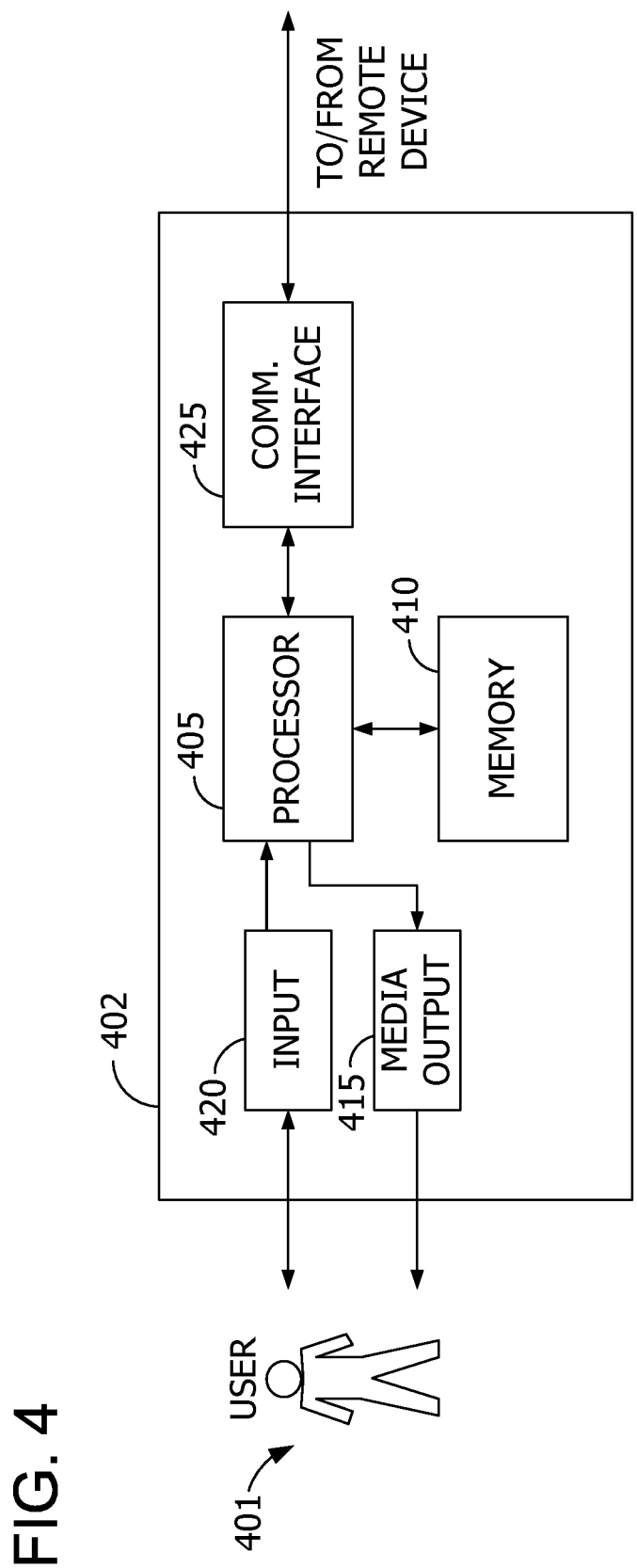

FIG. 4 depicts an exemplary configuration of a remote or user computing device 402, such as DA computing device 202 (shown in FIG. 2). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 401. Media output component 415 may be any component capable of conveying information to user 401. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 401.

In some embodiments, computing device 402 may include an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with, for example, a vendor or business.

Figure 5:
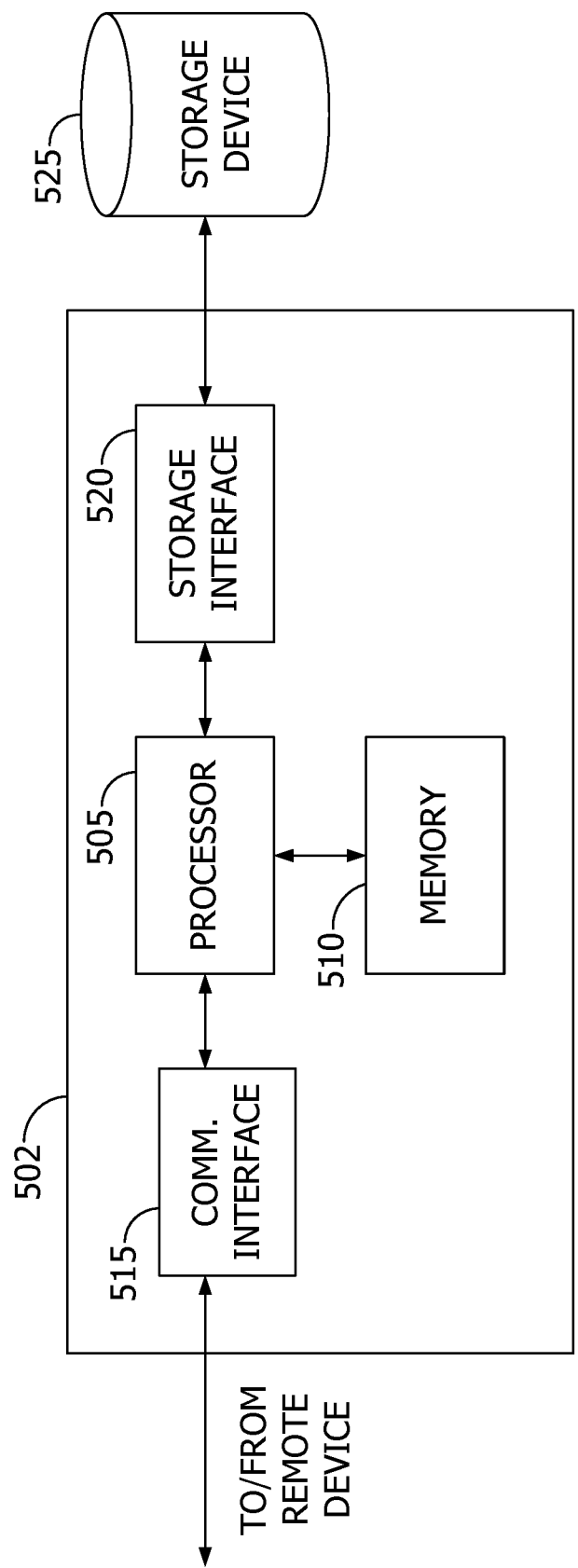

FIG. 5 depicts an exemplary configuration of a host computing device 502, such as DA computing device 102 (shown in FIG. 1) and host computing device 202 (shown in FIG. 2). Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as computing device 402 shown in FIG. 4 or another host computing device 502. For example, communication interface 515 may receive requests from user computing device 402 via the Internet.

Processor 505 may also be operatively coupled to a storage device 525 (e.g., first and second data storage devices 108, 110, shown in FIG. 1). Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
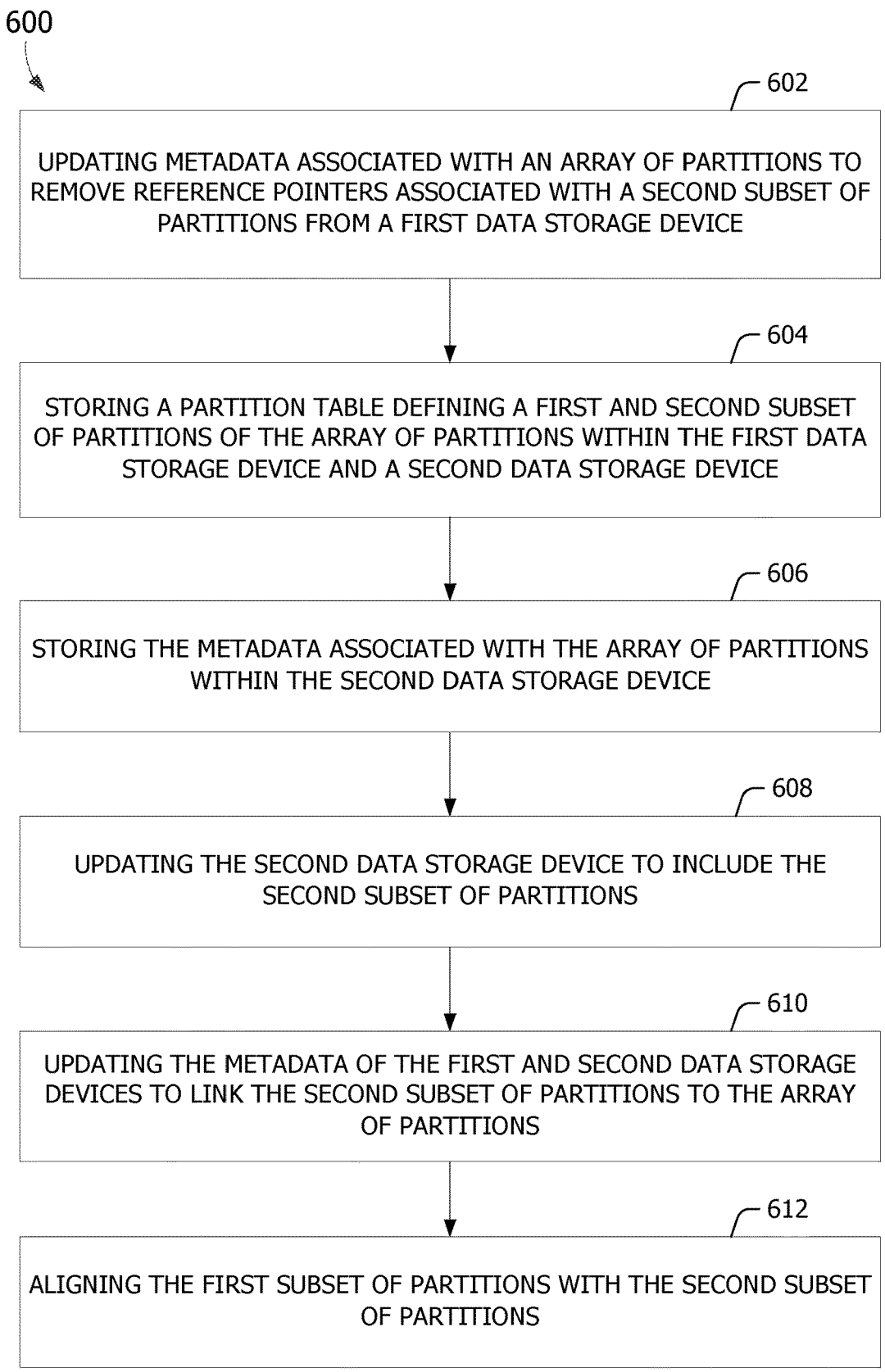

FIG. 6 is a flow diagram of an example method 600 for aligning data of an array of partitions between two data storage devices using a DA system, such as system 100 (shown in FIG. 1). Method 600 is at least partially performed by a DA computing device (e.g., DA computing device 102, shown in FIG. 1). In other embodiments, method 600 may include additional, fewer, or alternative steps, including those described elsewhere herein.

Method 600 begins with the DA computing device updating 602 metadata associated with an array of partitions that is stored by at least a first data storage device to remove reference pointers for a second subset of partitions of the array of partitions. Removing the reference pointers also removes the second subset of partitions from the array of partitions. The DA computing device stores 604 a partition table within the first data storage device and a second data storage device. The partition table defines the first subset of partitions within the first data storage device and a second subset of partitions within the second data storage device. The DA computing device stores 606 the metadata associated with the array of partitions within the second data storage device such that both the first and second data storage devices include a copy of the metadata. The DA computing device further updates 608 the second data storage device to include the second subset of partitions. In at least some embodiments, the DA computing device includes the second subset of partitions by removing at least one block device identifier associated with previous partitions from the second data storage device and scanning the stored partition table for the second subset of partitions to generate new block device identifiers for the second subset of partitions based on the partition table. The DA computing device also updates 610 the metadata stored by the first and second data storage devices to link the second subset of partitions back to the array of partitions. In the example embodiment, the DA computing device links the second subset of partitions to the array of partitions by updating 610 the metadata to include the reference pointers of the second subset of partitions. The reference pointers for the second subset of partitions are associated with the new block device identifiers for the second subset of partitions.

In the example embodiment, in response to linking the second subset of partitions to the array of partitions, the DA computing device aligns 612 the first subset of partitions with the second subset of partitions. In some embodiments, the DA computing device aligns 612 the two subsets of partitions by (i) removing the reference pointers associated with the first subset of partitions from the metadata, (ii) removing at least one block device identifier associated with the array of partitions from the first data storage device, (iii) scanning the stored partition table for the first subset of partitions to generate new block device identifiers for the first subset of partitions on the first data storage device, and (iv) updating the metadata to include the reference pointers for the first subset of partitions.

Figure 7:
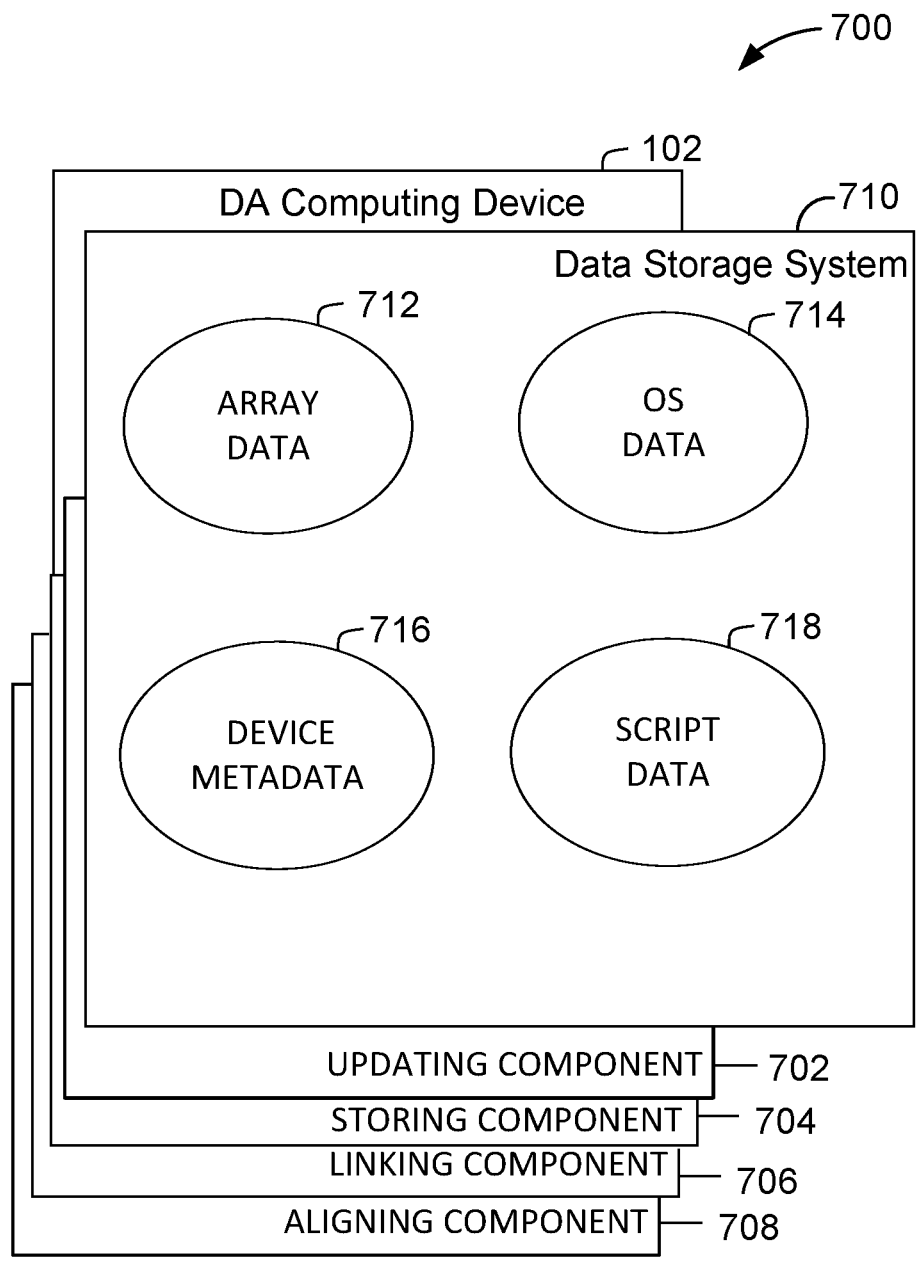

FIG. 7 is a diagram 700 of components of one or more example computing devices that may be used in the method shown in FIG. 6. FIG. 7 further shows a configuration of a data storage system 710 coupled to several separate components within DA computing device 102 (shown in FIG. 1), which perform specific tasks.

DA computing device 102 includes an updating component 702 configured to update metadata associated with an array of partitions to remove reference pointers for a second subset of partitions. Updating component 702 is further configured to update the second data storage device to include the second subset of partitions by removing at least one block device identifier associated with previous partitions from the second data storage device and scanning a stored partition table for the second subset of partitions to generate new block device identifiers for the second subset of partitions. DA computing device 102 also includes a storing component 704 configured to store a partition table that identifies the first and second subset of partitions at the first and second data storage devices. Storing component 704 is further configured to store the metadata associated with the array of partitions within the second data storage device. DA computing device 102 further includes a linking component 706 configured to link the second subset of partitions to the array of partitions by updating the metadata to include the reference pointers of the second subset of partitions that are associated with the new block device identifiers. In at least some embodiments, DA computing device 102 further includes an aligning component 708 configured to align the first and second subset of partitions by (i) removing reference pointers associated with the first subset of partitions from the metadata, (ii) removing at least one block device identifier associated with the array of partitions from the first data storage device, (iii) scanning the stored partition table for the first subset of partitions to generate new block device identifiers for the first subset of partitions on the first data storage device, and (iv) updating the metadata to include the reference pointers for the first subset of partitions.

In an exemplary embodiment data storage system 710 is divided into a plurality of sections, including but not limited to, an array data section 712, an OS data section 714, a device metadata section 716, and a script data section 718. These sections are interconnected through DA computing device 102 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A data alignment (DA) computing device configured to facilitate transition to a new operating system ("OS") on a redundant array storage system, the DA computing device comprising:
a processor communicatively coupled to a first data storage device and a second data storage device each operating under an initial OS, the first data storage device comprising a first subset of partitions and the second data storage device comprising a second subset of partitions, the first and second subsets of partitions forming a mirrored array of partitions defined by metadata stored on the first and second storage devices; and
a memory in communication with the processor, the memory storing instructions that, when executed by the processor, cause the processor to:
execute a configuration file that identifies the second subset of partitions as a failed device;
alter metadata to remove the second subset of partitions from the mirrored array of partitions;
install the new OS on the first data storage device, wherein the first data storage device operates under the new OS at least partially concurrently with the second subset of partitions being identified as the failed device;
after verifying an operability of the new OS on the first storage device, (i) update the metadata to re-establish the second subset of partitions as part of the mirrored array of partitions on the second data storage device and (ii) install the new OS on the second data storage device.

2. The DA computing device in accordance with claim 1, wherein the metadata includes reference pointers to each partition of the first and second subsets of partitions.

3. The DA computing device in accordance with claim 1, wherein the initial OS remains stored on the second storage device while the second subset of partitions is identified as the failed device.

4. The DA computing device in accordance with claim 1, wherein the instructions, when executed by the processor, further cause the processor to update the metadata to re-establish the second subset of partitions by:
removing at least one block device identifier associated with previous partitions from the second data storage device, wherein the previous partitions were defined prior to updating the metadata to remove the reference pointers; and
generating new block device identifiers to be associated with the re-established second subset of partitions within the second data storage device.

5. The DA computing device in accordance with claim 4, wherein the previous partitions of the second data storage device include at least one partition associated with the initial OS, wherein the at least one partition is removed from the second data storage device when removing the at least one block device identifier associated with the previous partitions from the second data storage device.

6. The DA computing device in accordance with claim 1, wherein the instructions, when executed by the processor, further cause the processor to update the metadata to re-establish the first subset of partitions by:

removing at least one block device identifier associated with previous partitions of the first data storage device, wherein the previous partitions were defined prior to installing the new OS; and generating new block device identifiers to be associated with the re-established first subset of partitions within the first data storage device.

7. The DA computing device in accordance with claim 6, wherein the instructions, when executed by the processor, further cause the processor to configure the re-established first subset of partitions within the first data storage device and the re-established second subset of partitions within the second data storage device in a redundant array of independent disks (RAID) 1 configuration.

8. A method for facilitating transition to a new operating system ("OS") on a redundant array storage system including a first data storage device and a second data storage device each operating under an initial OS, the first data storage device comprising a first subset of partitions and the second data storage device comprising a second subset of partitions, the first and second subsets of partitions forming a mirrored array of partitions defined by metadata stored on the first and second storage devices, said method comprising:

executing, by a data alignment (DA) computing device, a configuration file that identifies the second subset of partitions as a failed device;

altering, by the DA computing device, metadata to remove the second subset of partitions from the mirrored array of partitions;

installing, by the DA computing device, the new OS on the first data storage device, wherein the first data storage device operates under the new OS at least partially concurrently with the second subset of partitions being identified as the failed device;

after verifying an operability of the new OS on the first storage device, (i) updating, by the DA computing device, the metadata to re-establish the second subset of partitions as part of the mirrored array of partitions on the second data storage device and (ii) installing, by the DA computing device, the new OS on the second data storage device.

9. The method in accordance with claim 8, wherein the metadata includes reference pointers to each partition of the first and second subsets of partitions.

10. The method in accordance with claim 8, wherein the initial OS remains stored on the second storage device while the second subset of partitions is identified as the failed device.

11. The method in accordance with claim 8, wherein updating the metadata to re-establish the second subset of partitions comprises:

removing at least one block device identifier associated with previous partitions from the second data storage device, wherein the previous partitions were defined prior to updating the metadata to remove the reference pointers; and generating new block device identifiers to be associated with the re-established second subset of partitions within the second data storage device.

12. The method in accordance with claim 11, wherein the previous partitions of the second data storage device include at least one partition associated with the initial OS, and wherein removing the at least one block device identifier associated with the previous partitions from the second data storage device comprises removing the at least one partition from the second data storage device.

13. The method in accordance with claim 8, further comprising updating the metadata to re-establish the first subset of partitions by:

removing at least one block device identifier associated with previous partitions of the first data storage device, wherein the previous partitions were defined prior to installing the new OS; and generating new block device identifiers to be associated with the re-established first subset of partitions within the first data storage device.

14. The method in accordance with claim 13, further comprising configuring the re-established first subset of partitions within the first data storage device and the re-established second subset of partitions within the second data storage device in a redundant array of independent disks (RAID) 1 configuration.

15. At least one non-transitory computer-readable storage media having computer-executable instructions embodied thereon for facilitating transition to a new operating system ("OS") on a redundant array storage system including a first data storage device and a second data storage device each operating under an initial OS, the first data storage device comprising a first subset of partitions and the second data storage device comprising a second subset of partitions, the first and second subsets of partitions forming a mirrored array of partitions defined by metadata stored on the first and second storage devices, wherein when executed by at least one processor, the computer-executable instructions cause the at least one processor to:

execute a configuration file that identifies the second subset of partitions as a failed device;

alter metadata to remove the second subset of partitions from the mirrored array of partitions;

install the new OS on the first data storage device, wherein the first data storage device operates under the new OS at least partially concurrently with the second subset of partitions being identified as the failed device;

after verifying an operability of the new OS on the first storage device, (i) update the metadata to re-establish the second subset of partitions as part of the mirrored array of partitions on the second data storage device and (ii) install the new OS on the second data storage device.

16. The computer-readable storage media in accordance with claim 15, wherein the metadata includes reference pointers to each partition of the first and second subsets of partitions.

17. The computer-readable storage media in accordance with claim 15, wherein the initial OS remains stored on the second storage device while the second subset of partitions is identified as the failed device.

18. The computer-readable storage media in accordance with claim 15, wherein the computer-executable instructions further cause the processor to update the metadata to re-establish the second subset of partitions by:

removing at least one block device identifier associated with previous partitions from the second data storage device, wherein the previous partitions were defined prior to updating the metadata to remove the reference pointers; and generating new block device identifiers to be associated with the re-established second subset of partitions within the second data storage devices.

19. The computer-readable storage media in accordance with claim 18, wherein the previous partitions of the second data storage device include at least one partition associated with the initial OS, wherein the at least one partition is removed from the second data storage device when removing the at least one block device identifier associated with the previous partitions from the second data storage device.

20. The computer-readable storage media in accordance with claim 15, wherein the computer-executable instructions further cause the processor to update the metadata to re-establish the first subset of partitions by:
  removing at least one block device identifier associated with previous partitions of the first data storage device, wherein the previous partitions were defined prior to installing the new OS; and
  generating new block device identifiers to be associated with the re-established first subset of partitions within the first data storage device.

* * * * *